(12) United States Patent
Chang

(10) Patent No.: US 10,486,409 B1
(45) Date of Patent: Nov. 26, 2019

(54) PRESCRIPTION LABEL REMOVER

(71) Applicant: Herman Chang, Rancho Dominguez, CA (US)

(72) Inventor: Herman Chang, Rancho Dominguez, CA (US)

( * ) Notice: Subject to any disclaimer, the term of this patent is extended or adjusted under 35 U.S.C. 154(b) by 0 days.

(21) Appl. No.: 14/465,688

(22) Filed: Aug. 21, 2014

Related U.S. Application Data

(60) Provisional application No. 61/869,523, filed on Aug. 23, 2013, provisional application No. 61/936,802, filed on Feb. 6, 2014.

(51) Int. Cl.
*B32B 43/00* (2006.01)
*B32B 38/10* (2006.01)

(52) U.S. Cl.
CPC ............ *B32B 43/006* (2013.01); *B32B 38/10* (2013.01); *B32B 2439/80* (2013.01); *Y10T 156/1153* (2015.01); *Y10T 156/1184* (2015.01); *Y10T 156/1911* (2015.01); *Y10T 156/1961* (2015.01); *Y10T 156/1967* (2015.01)

(58) Field of Classification Search
CPC . B32B 38/10; B32B 43/006; Y10T 156/1153; Y10T 156/1184; Y10T 156/1911; Y10T 156/1961; Y10T 156/1967
USPC ........ 156/711, 717, 752, 761, 762, 921, 936
See application file for complete search history.

(56) References Cited

U.S. PATENT DOCUMENTS

| | | | | |
|---|---|---|---|---|
| 4,013,497 A * | 3/1977 | Wolf | ....................... | B08B 9/083 15/59 |
| 4,325,775 A * | 4/1982 | Moeller | .................. | B08B 9/083 134/104.4 |
| 4,599,131 A * | 7/1986 | Matuszak | ............... | B08B 9/083 15/60 |
| 4,715,920 A * | 12/1987 | Ruppman | ............... | B03B 9/061 134/104.4 |
| 5,536,355 A * | 7/1996 | Rowland | ................... | B08B 1/04 15/57 |
| 5,651,846 A * | 7/1997 | Hurst | ....................... | B08B 9/083 15/59 |
| 5,685,053 A * | 11/1997 | Deonarine | .............. | B08B 9/083 134/34 |
| 5,718,030 A * | 2/1998 | Langmack | .............. | B08B 9/083 15/63 |
| 6,199,615 B1 * | 3/2001 | Klarl | ....................... | B08B 9/083 156/706 |
| 6,680,097 B1 * | 1/2004 | Amberger | ................. | G09F 3/02 134/10 |
| 7,398,594 B2 * | 7/2008 | Ribi | ......................... | B08B 5/02 156/750 |

(Continued)

*Primary Examiner* — Mark A Osele
*Assistant Examiner* — Nickolas R Harm
(74) *Attorney, Agent, or Firm* — Stefan J. Kirchanski; Matthew J. Spark; Zuber Lawler & Del Duca LLP

(57) ABSTRACT

A unit for automatically removing labels from a pharmacy container operates by heating the labels to soften the pressure sensitive adhesive thereon. After the adhesive is softened, the containers are rotated and brought into contact with a scrapper which peels off the label. The removed label falls into a container or directly into a shredding mechanism that is integral with the label remover. One embodiment of the device uses a chilled mandril inserted into the container to keep the container from softening when heat is applied to facilitate label removal.

15 Claims, 3 Drawing Sheets

(56) References Cited

U.S. PATENT DOCUMENTS

2003/0070754 A1\* 4/2003 Francis .................. B03B 9/061
  156/709
2010/0276083 A1\* 11/2010 Hurst ..................... B08B 9/083
  156/717
2012/0165188 A1\* 6/2012 Croskey .............. B41M 7/0009
  503/201

\* cited by examiner

PRESCRIPTION LABEL REMOVER

CROSS-REFERENCE TO PRIOR APPLICATIONS

The current application is based on and claims benefit of and priority from U.S. Provisional Patent Application No. 61/869,523, filed 23 Aug. 2013 and U.S. Provisional Patent Application No. 61/936,802, filed 6 Feb. 2014.

U.S. GOVERNMENT SUPPORT

NA

AREA OF THE ART

The present invention involves a device and process for removing adhesive labels from containers.

BACKGROUND

Pressure sensitive adhesives have revolutionized the labeling industry; now it is an easy matter to print custom labels—as with a laser or inkjet printer—and apply the printed label to a container. This has been particularly useful in labeling bottles that hold prescription medicines. In the past it was necessary to type or handwrite a prescription label and apply it to a container with glue or cellophane tape. Now a label printer prints the information on a pressure sensitive label which is then applied to plastic container. Depending on the scale of the pharmacy operation the labels are printed on strips and manually applied to the containers or where large numbers of prescriptions are being filled, a machine automatically applies the printed label to the containers. Modern pharmacy labels contain not only the patient's name and prescription information (e.g. prescription number, name of prescribing physician, name of drug and instructions for use) but often also contain a bar code or other machine-readable code for use in automated inventory control and quality control.

The problem is that the label provides a virtual treasure trove of personal confidential information. When the pharmacy produces excess labeled containers or when the patients return empty prescription bottles, the pharmacy must destroy the labeled containers to preserve patient confidentiality. As a result many pharmacies maintain bins of used containers with those containing personal information segregated from "safe" containers having no such confidential information. The result is that the pharmacy must carefully guard the containers bearing personal information until they are removed by a recycling service. Because the service is expected to preserve the confidentiality of the information, the entire process resembles the collection of money by armed guards with an armored truck. Needless to say, the service is not inexpensive. In addition, there are a number of Federal laws (such as The Health Insurance Portability and Accountability Act of 1996 [HIPAA]) that levy significant penalties for violating patient confidentiality.

Therefore, there is considerable need for a method/device that allows the pharmacy to remove personal information from containers readily so that normal, low cost recycling services can be used. One possibility would be for the pharmacy to simply crush or shred the labeled containers to render the labels unreadable. However, this requires expensive and unusual shredding equipment and the resulting crushed or shredded plastic contains label fragments which render the plastic less desirable for recycling. A simple method is needed for removing pressure sensitive labels from prescription containers. After removal, the labels can be shredded by conventional paper shredders. At the very least, a method is needed to render the labels unreadable.

It is known to strip the labels from the containers by hand. However, unless only a small number of bottles are to be treated, hand stripping of labels is tedious at best. It is often difficult to peel off enough of the label to allow one to strip off the rest of the label. Often the label will tear during removal, thus leaving strips of label that are difficult to remove. One can use a razor blade or knife edge to aid in the stripping process, but a slip may well lead to a painful and messy cut.

It is also known to treat the label with some sort of solvent—organic or water-based—to loosen the adhesive after which the label can be more readily removed. However, even "non-toxic" solvents can be irritating or inflammable. Volatile organic compounds (VOC) regulations in many states and regions regulate or prohibit use of many solvents suitable for label removal. Water-based solvents usually contain VOCs or organic surfactants that pose disposal problems—not to mention the cost of the solvents themselves. In any case, solvent based systems add complexity and cost.

SUMMARY OF THE INVENTION

A dedicated pharmacy label remover is designed to remove patient information and make recycling of labeled pharmacy containers much easier. Rather than manually removing labels, a labeled pharmacy container is inserted into the remover device. Preferably the device has a plurality of cavities sized to receive the containers. The inserted containers are gripped by a rotating shaft or are rotated within the cavity by drive wheels. Either the cavity itself is heated or hot air or a movable heating element heat the surface of the container so as to soften the pressure sensitive adhesive affixing the label to the container. Once the adhesive is softened a scraper is automatically brought into contact with the container to scrape off the softened label. Various types of blades or vanes can be used as scrapers. Rotating wire brushes, abrasive rotating cylinders or abrasive moving belts may also act as scrapers. The label fragments fall from the scrapers into a waste container for later removal. A paper shredding mechanism can be located between the scraper and the waste container to ensure that all readable information on the labels is destroyed. Chilled mandrills can be inserted into the containers so that they do not soften excessively when the label is heated or removed.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a device and method for removing labels from prescription medicine containers.

Figure 1:
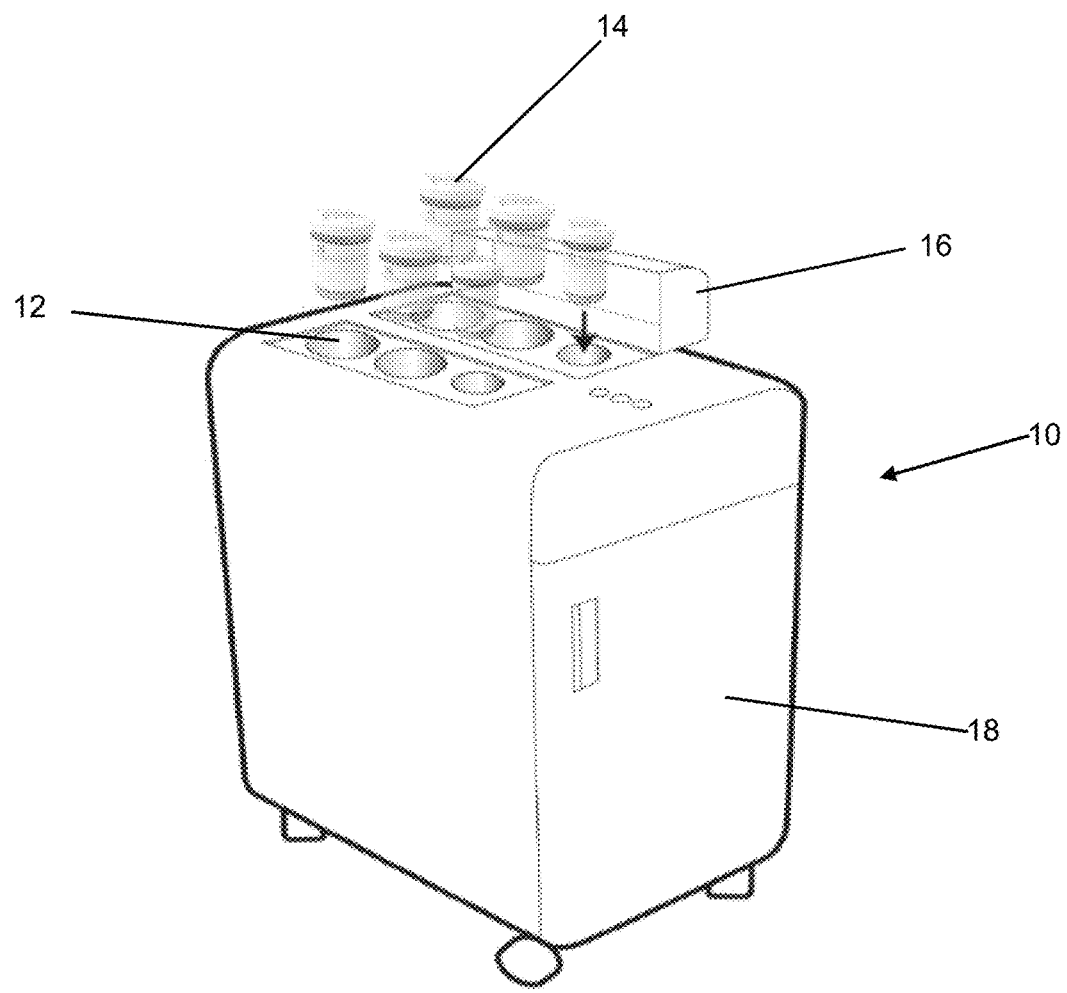
FIG. 1 is perspective drawing of one embodiment of the device.

The present invention is a simple to use, portable device for removing labels from prescription containers. As shown in FIG. 1 one embodiment the unit 10 has one or more openings or cavities 12 sized to receive common sizes of prescription containers 14 so that the container can be inserted into a cavity shaped to surround it. These openings may or may not be equipped with a cover 16 to seal the device 10 during operation. The covers are indicated diagrammatically. The precise manner in which they engage with the device 10 to cover the openings 12 is not critical. When the device is activated a heating system raises the temperature of the containers to a predetermined temperature that is below the temperature at which the plastic containers melt and below the temperature at which the labels might combust. Traditionally pharmacy container were glass, but today, pharmaceutical containers are generally molded from polystyrene plastic although containers of PET (polyethylene terephthalate) polypropylene and polyethylene are also common. Because traditional polystyrene softens above 100° C., the maximum temperature is somewhat limited. However, the temperature must be sufficiently high to soften the pressure sensitive label adhesive. The cavities 12 are preferably formed from or lined with metal. For example, each cavity can be a metallic cylinder formed by bending or stamping sheet metal. Alternatively, the cavities can be formed by casting metal or by drilling into a metal block. The structure can also be molded from a high temperature resistant polymer such as polysulfone or even phenol-formaldehyde resin (AKA Bakelite). Where the cavities are metallic the containers can be heated by heating elements in thermal contact with the cavities. Alternately the containers can be heated by circulating hot air in which case the cavities are advantageously equipped with slots or other opening to accommodate air circulation. Once the prescription containers are properly heated, a drive mechanism rotates each container and a scraper vane or blade either integral with the cavity or inserted into the cavity through a slot in the cavity slide, catches the edge of the softened label causing it to detach from the container and ultimately fall into a receptacle in the base of the unit. It will be appreciated that because plastics such as polystyrene have a relatively low softening temperature, it may be advantageous to heat the surfaces of the containers rapidly, as with hot air, and scrape off the labels before the bulk plastic of the container has time for heat fully. The receptacle that receives the removed labels can later be emptied into a paper shredder by opening a door 18 in the unit 10. Alternatively, a shredder mechanism can be included within the device 10 so that the door 18 is opened to remove a waste bin filled with shredded labels. With this arrangement, security of the patient data is enhanced since once a bottle is inserted into the unit, patient data can no longer be accessed.

An alternative embodiment does not actively rotate the container but rather contacts the container with a rotating roller with a textured surface, scraper vanes or blades, a wire brush or moving belt which bears one or more scraper vanes/blades or a textured surface (rather like a belt sander). The labels or portions thereof become caught on the roller or belt and are stripped from the container and transferred to the roller or belt. The contact with the roller causes the container to rotate within the cavity so all sides of it are contacted. In this process a portion of the pressure sensitive adhesive remains affixed to the container. Therefore, the stripped labels are not particularly sticky and readily detach from the rollers or belts and fall into the receptacle (or shredding mechanism as the case may be). Where a wire brush is used, the label is really not entirely removed, but the surface of the label is sufficiently scraped so as to render it unreadable.

Figure 3:
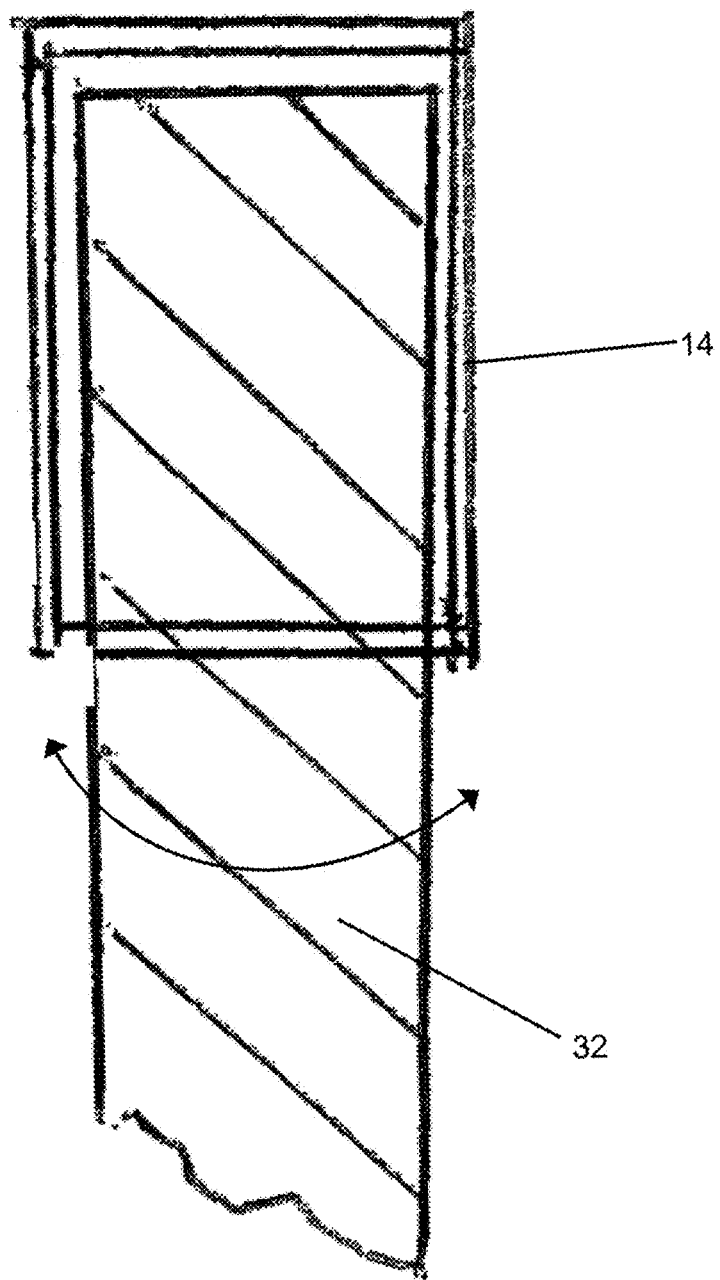
FIG. 3 is a diagrammatic cross-section of a chilled mandril.

There can be a problem in heating the containers sufficiently to facilitate label removal without causing the bottles to soften and deform. This problem is exacerbated by the variety of different plastics used to manufacture the prescription containers. It is necessary to select the "lowest common denominator" (about 100° C. because of polystyrene)—that is a softening temperature below the softening point of the plastic with the lowest softening temperature. One way to avoid the softening problem is to place each of the containers on the end of a chilled mandril (chilled by conventional vapor compression refrigeration or by peltier effect) sized to fit the container. The container can then be rotated (either by turning the mandril or by a drive wheel that rotates the container on a stationary mandril. As the container rotates hot air or a linear heating element (e.g., a radiant heat source such as a nichrome coil within a quartz tube) in proximity to the container heats the surface of the label to facilitate removal as explained above. At the same time, the chilled mandril prevents the container from melting or deforming. It will be appreciated that the simplest way to use a chilled mandril 32 is to invert an empty container 14 on a properly sized mandril 32 as shown in FIG. 3. Since it is best practice t remove the medication for safe disposal, it is really not all that inconvenient to remove the container lid, dump out any medication therein and place the container over the chilled mandril.

Figure 2:
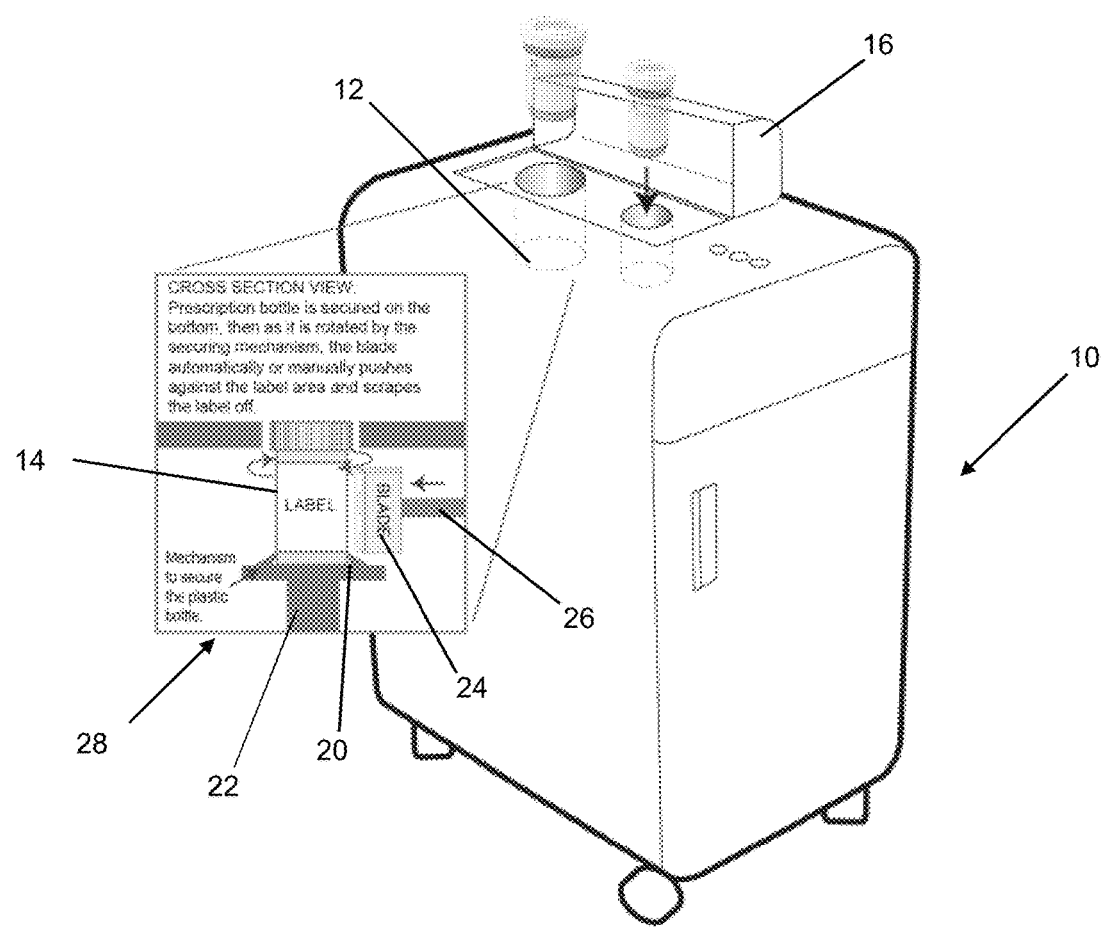
FIG. 2 is a perspective view of another embodiment of the device.

It is also possible to use a blade or scrapper to remove or obscure the label without first applying heat. For such an arrangement it is advantageous to use a relatively sharp blade. One possible configuration of such a device is shown in FIG. 2. The containers 14 are inserted into the device through sized opening 12. Once inserted, the containers 14 are gripped by a securing mechanism 20 which is part of a rotation mechanism 22 as shown in the inserted close-up 28. In the figure this is represented as the jaws of a chuck. It is also possible to press the container down onto a barbed end of a rotatable shaft. The barbs penetrate the plastic to drive the rotation. A lid 16 (shown diagrammatically in an open position; for example by a spring-loaded point) can be used to maintain contact with the container at one limited central location so as to maintain the container pressed down onto the barbs. After rotation starts, a blade 24 attached to an advancing mechanism 26 (for example, a rack driven by a pinion rotated by a stepper motor drive) is brought into contact with the container to scrape the label from the container. The system automatically adjusts the contact between the blade and container by judging rotational drag caused by the contact. The blade slowly approaches the rotating container until there is sufficient contact to barely slow the rotation. Alternatively, this contact can be judged by measuring the sound the blade makes in contacting the container. The blade drive system advantageously includes a resilient spring component so that the blade maintains contact even with a slightly eccentrically rotating container. Again, the removed label material falls into a waste tray or integral shredder. Of course, this arrangement could also be effectively used with applied heat with or without a chilled mandril.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A system for removing pressure sensitive adhesive labels from a prescription container comprising:
 a housing including a plurality of cavities, each cavity enclosing only a single labeled prescription container when said container is inserted therein;
 means for rotating containers inserted into the cavities;
 a heater for heating said containers so as to soften pressure sensitive adhesive; and
 strippers for stripping heat loosened labels from said containers.

2. The system according to claim 1, wherein the heater comprises a hot air blower.

3. The system according to claim 1, wherein the heater comprises a linear heating element.

4. The system according to claim 1, wherein the strippers comprise moving rollers or belts that contact said containers.

5. The system according to claim 4, wherein the moving rollers comprise wire brushes.

6. The system according to claim 1, wherein each stripper comprises a vane or a blade that contacts one of said containers.

7. A system for removing pressure sensitive adhesive labels from a prescription container comprising:
 a housing including at least one cavity enclosing only a single labeled prescription container when said container is inserted therein;
 a chilled mandril for inserting into said container for cooling the inner surfaces thereof;
 a heater for heating the labeled container while within the at least one cavity so as to soften pressure sensitive adhesive;
 a stripper for stripping heat loosened labels from the container while within the at least one cavity; and
 a receptacle for receiving the labels.

8. A method for removing pressure sensitive adhesive labels from a prescription container comprising:
 inserting the container into a cavity in a housing of a device;
 heating the container to soften pressure sensitive adhesive; and
 stripping the labels from the container within the cavity.

9. The method according to claim 8, wherein the step of heating is accomplished by hot air contacting the containers.

10. The method according to claim 8, wherein the step of heating is accomplished by linear heating element.

11. The method according to claim 8, wherein the step of stripping comprises rotating the container and contacting the container with a removal vane or blade whereby a label is removed from the container.

12. The method according to claim 8, wherein the step of stripping comprises contacting the container with a moving roller or belt whereby a label transfers from the container to the moving roller or belt.

13. The method according to claim 8 further comprising a step of rotating the container.

14. A method for removing pressure sensitive adhesive labels from a prescription container comprising:
 inserting a container into an opening in the housing of a device;
 heating an outer surface of the container to soften pressure sensitive adhesive while chilling an inner surface of the container; and
 stripping the labels from the container.

15. A system for removing pressure sensitive adhesive labels from prescription containers comprising:
 a housing having a plurality cavities, each cavity enclosing one individual prescription container when said container is inserted therein;
 a rotating mechanism for rotating each of the prescription containers that have been inserted into the cavities, the rotating mechanism including a chuck or barbed shaft that interacts with a portion of each of the containers; and
 a drive for moving a blade into contact with each of the prescription containers inserted into one of in the cavities so as to scrape at least part of the label.

* * * * *